Patented July 16, 1940

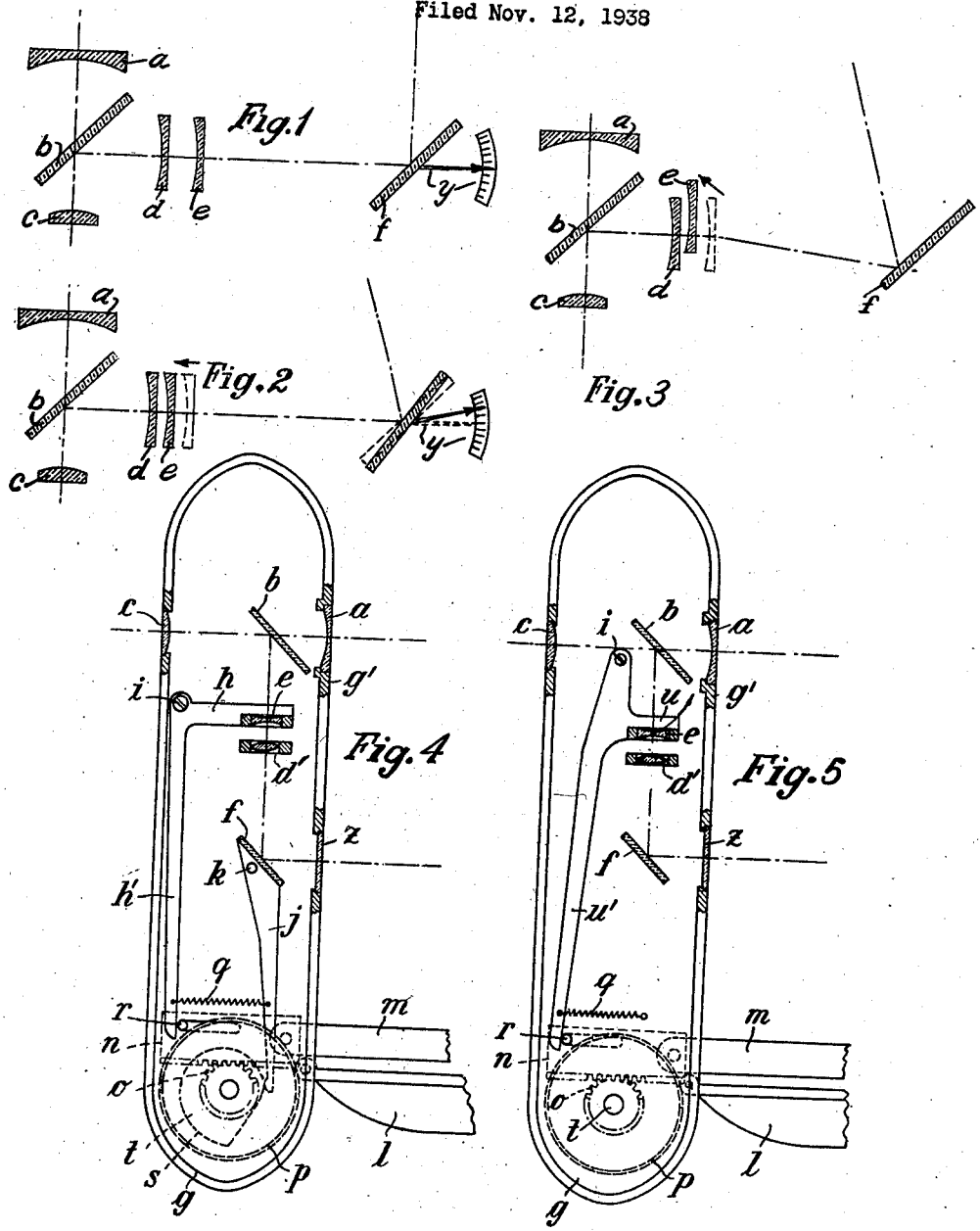

2,208,222

UNITED STATES PATENT OFFICE 2,208,222

RANGE FINDER

Friedrich Mische, Brunswick, Germany, assignor to Voigtländer & Sohn Aktiengesellschaft, Brunswick, Germany, a joint-stock company of Germany Application November 12, 1938, Serial No. 240,096
In Germany November 26, 1937

3 Claims. (Cl. 88—2.4)

My invention relates to improvements in range finders, and more particularly in range finders of the type in which pencils of rays emanating from an object are made to coincide into a single image viewed through an ocular lens by means of object lenses located at opposite ends of a base line and angularly disposed adjustable mirrors, the image produced by one of said object lenses being directly viewed through said ocular lens and one of the said angularly disposed mirrors which is made semi-transparent, and the pencil of rays impinging upon the other object lens being reflected by and viewed through both angularly disposed mirrors and the ocular lens. In range finders of this type such as are now in use the image produced by the pencil reflected by the mirrors is smaller than the image directly viewed through said semi-transparent mirror, which frequently results in inaccurate measurement, the inaccuracy being so much the greater the smaller the distance of the object is, and the farther away from the center of the image corresponding parts are made to coincide.

The object of the improvements is to provide a range finder of the type indicated by means of which accurate measurements are made, and with this object in view my invention consists in constructing the range finder in such a way that the images are equal in size for any range to be measured. In carrying out the invention one of the object lenses of the finder is constructed so as to have its focal length variable in accordance with the range to be measured. In one embodiment of the invention the variable objective comprises a plurality of lenses one or more of which are mounted so as to be shiftable in the direction of the optical axis.

The sectional images may be made to coincide either by varying the angular position of one of the said mirrors, or by shifting one of the object lenses transversely of the optical axis. In the first named case the means for turning the said mirror are connected with the means for axially shifting the said lens or lenses, and in the last named case the axial and transverse movements of the said lens or lenses are combined into a resultant movement.

For the purpose of explaining the invention two examples embodying the same have been shown in the accompanying drawing in which Fig. 1 is a diagrammatical view showing a system comprising a mirror of variable angularity and an objective comprising two lenses which are adjustable relatively to each other in axial direction, the said mirror and lenses being in positions for measuring infinite ranges, Fig. 2 is a similar view showing the mirror and lenses in positions for measuring comparatively small ranges, Fig. 3 is a similar view showing a modification comprising a fixed angular mirror and an objective comprising a fixed lens and a lens which is axially and transversely shiftable, Fig. 4 is a sectional elevation showing a practical embodiment of the invention as illustrated in Figs. 1 and 2, and Fig. 5 is a similar sectional elevation showing a practical embodiment of the invention as illustrated in Fig. 3.

In the example shown in Figs. 1 and 2 the range finder comprises a negative object lens $a$, a positive ocular lens $c$, an objective consisting of two negative lenses $d$ and $e$, an angularly disposed semi-transparent mirror $b$ located between the lenses $a$ and $e$, and an angularly disposed mirror $f$, the lenses $d$ and $e$ being located between the mirrors $b$ and $f$. The lenses and mirrors are disposed so that by pencils of rays emanating from an object virtual images are produced by the negative object lenses $a$ and $d$, $e$, which are viewed through the ocular lens $a$, the rays passing from the lens $a$ directly through the semi-transparent mirror $b$, while the pencil of rays passing through the lenses $d$, $e$ is reflected by the mirrors $f$ and $b$.

The lenses $d$ and $e$ are mounted relatively to each other so that they are adapted to be shifted towards and away from each other for varying the focal length of the system $d$, $e$, and the mirror $f$ is mounted so as to be adapted to be turned about a vertical axis in accordance with the distance of the object. As is known in the art, the mirror $f$ is connected or provided with means for indicating the angularity and the distance of the object, or with a device controlled in accordance with the said distance. In Figs. 1 and 2 as an example a hand and scale marks $y$ have been indicated. The lens $e$ is connected with the mirror $f$ so that the focal length of the system $d$, $e$ and the angular position of the mirror $f$ are simultaneously set according to the distance of the object. Fig. 2 shows the said lens $e$ and the mirror $f$ in different positions, the position shown in dotted lines corresponding to the position of the parts shown in Fig. 1 and to an object located at an infinite distance, and the position shown in full lines corresponding to an object located near the range finder.

In the modification shown in Fig. 3 the lenses and mirrors are similar to the lenses and mirrors shown in Fig. 1. But the mirror $f$ is not pivotally mounted, but it is fixed in position, and in lieu thereof the lens $e$ is movable in transverse direction for deflecting a pencil of rays which is at an angle to the pencil shown in Fig. 1 and impinging upon the mirror $f$ into the direction of the optical axis of the lens $d$. Thus the lens $e$ has both axial and transverse movement, and its carrier is guided for being movable through a path imparting the said movements to the lens.

In Fig. 4 I have shown a practical embodiment of the system described with reference to Figs. 1 and 2 as used in a camera. The said camera comprises a body $g$ to which a base board $l$ is hinged. The object lens $a$ is mounted in the front wall $g'$ of the body $g$, and the ocular lens $c$ in the rear wall thereof. The mirror $b$ and the lens $d'$ are mounted on the side wall of the body $g$ and internally thereof. The lens $e$ is mounted coaxially of the lens $d'$ on an arm $h$ pivotally mounted on the said side wall of the body $g$ at $i$. The mirror $f$ is carried by an arm $j$ pivotally mounted on the said side wall of the body at $k$. In front of the said mirror $f$ a glass plate $z$ is provided in the front wall $g'$ of the body $g$.

The photographic lens (not shown) is adapted to be set for focusing by means of a rod $m$ jointed to a rack $n$ engaging a gear wheel $o$ and to the shaft $t$ of the said gear wheel a milled disk $p$ is secured which is located at the outside of the body $g$. Thus the camera lens may be set for focusing by means of the said disk $p$ through the intermediary of the rack $n$. The arm $h$ is made integral with a downwardly directed arm $h'$, which is held by a spring $q$ in engagement with a pin $r$ fixed to the rack $n$. Said spring is also attached to the arm $j$ and tends to hold the same in engagement with a cam disk $s$ fixed to the shaft $t$.

When the disk $p$ is turned for focusing the camera lens the bell crank lever $h$, $h'$ is turned to the right or left, and thereby the lens $e$ is shifted axially of the lens $d'$ for the purpose described above, and the lever $j$ is turned by the cam disk $s$ for varying the angular position of the mirror $f$ in accordance with the distance of the object. The slight lateral displacement of the lens $e$ caused by the pivotal movement of the arm $h$ is compensated by the shape of the cam disk $s$ and the angular position of the mirror $f$.

In Fig. 5 I have shown a practical embodiment of the modification described with reference to Fig. 3. The construction is substantially the same as that described with reference to Fig. 4, and the same letters of reference have been used to indicate corresponding parts. As distinguished from the construction shown in Fig. 4 the mirror $f$ is stationary, and in lieu thereof the lens $e$ has transverse movement in addition to the axial movement thereof. For this purpose the bell crank lever $u$, $u'$ has its fulcrum $i$ above the lenses $d'$, $e$, so that the movement imparted to the arm $u'$ results in a substantial transverse movement of the lens $d'$. The position of the fulcrum $i$ and the lengths of the arms $u$ and $u'$ are such that the axial displacement of the lens $e$ compensates the difference of the sizes of the virtual images produced by the said lenses, and that the transverse displacement of the said lens $e$ causes the virtual images produced respectively by the lenses $d'$, $e$ and the lens $a$ to coincide.

In the constructions shown in Figs. 4 and 5 the lenses $d'$ are positive lenses, and therefore, when the object to be photographed is at an infinite distance the lens $e$ is near the lens $d'$.

I claim:

1. A range finder, comprising an object lens, an ocular lens mounted coaxially thereof and forming with the object lens a telescope, a semi-transparent mirror disposed obliquely to the line of sight of such telescope, an oblique mirror mounted laterally of the line of sight of such telescope and adapted to direct a pencil of rays towards said semi-transparent mirror, an object lens in the path of the pencil of rays directed by the said laterally mounted mirror to the said semi-transparent mirror and forming with the said ocular lens a second telescope, one of said object lenses being compound and its components being relatively adjustable for varying focal length, and means for simultaneously varying the focal length of such compound object lens and the angularity of the line of sight of one of such telescopes relatively to the other.

2. A range-finder comprising an object lens, an ocular lens assembled with the object lens and forming therewith a telescope, a semi-transparent mirror disposed between said lenses and arranged obliquely to the line of sight of such telescope, a second mirror mounted in lateral position with respect to the line of sight of such telescope and arranged to direct rays of light from an object in the field of such telescope to said semi-transparent mirror, such second mirror being movable angularly in its mounting, an object lens including two relatively adjustable components arranged in the path of light from the laterally positioned mirror to the semi-transparent mirror and forming with the ocular lens a second telescope, and means for simultaneously moving angularly the laterally disposed mirror and adjusting relatively to one another the components of the object lens last named.

3. A range-finder comprising an object lens, an ocular lens assembled with the object lens and forming therewith a telescope, a semi-transparent mirror disposed obliquely between said lenses and arranged obliquely to the line of sight of such telescope, a second mirror mounted in lateral position with respect to the line of sight of such telescope and arranged to direct rays of light from an object in the field of such telescope to said semi-transparent mirror, an object lens arranged in the path of light from the laterally positioned mirror to the semi-transparent mirror and forming with the ocular lens a second telescope, the object lens last named including two components adjustable in their relative positions both in the direction of the line of sight of such second telescope and transversely thereof, and means for effecting simultaneous adjustment of the said components of the object lens last named in both of the two directions named.

FRIEDRICH MISCHE.